(12) United States Patent
Wierzbicki et al.

(10) Patent No.: US 11,590,661 B2
(45) Date of Patent: Feb. 28, 2023

(54) ROBOTIC SANDING SYSTEMS AND METHODS

(71) Applicant: THE BOEING COMPANY, Chicago, IL (US)

(72) Inventors: Dominic Wierzbicki, Melbourne (AU); Benjamin Stanislaw Zielinski, Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 219 days.

(21) Appl. No.: 16/862,759

(22) Filed: Apr. 30, 2020

(65) Prior Publication Data

US 2021/0339400 A1 Nov. 4, 2021

(51) Int. Cl.
| | | |
|---|---|---|
| B25J 11/00 | (2006.01) | |
| B24B 41/04 | (2006.01) | |
| B24B 53/017 | (2012.01) | |
| B24B 57/02 | (2006.01) | |
| B25J 13/08 | (2006.01) | |
| B24B 41/00 | (2006.01) | |

(52) U.S. Cl.
CPC ........... *B25J 11/0065* (2013.01); *B24B 41/04* (2013.01); *B24B 53/017* (2013.01); *B24B 57/02* (2013.01); *B25J 13/086* (2013.01); *B24B 41/002* (2013.01)

(58) Field of Classification Search
CPC ..... B25J 11/0065; B25J 13/086; B24B 41/04; B24B 53/017; B24B 57/02; B24B 41/002
USPC .......................... 451/1, 5, 64, 270, 340, 363
See application file for complete search history.

(56) References Cited

U.S. PATENT DOCUMENTS

| | | | |
|---|---|---|---|
| 3,027,625 A | 4/1962 | Darrell | |
| 3,882,644 A * | 5/1975 | Cusumano | ............ B24B 55/102 |
| | | | 451/359 |
| 5,885,136 A * | 3/1999 | Bergqvist | ................ B24B 55/02 |
| | | | 451/48 |
| 9,840,010 B2 | 12/2017 | Lee | |
| 10,035,237 B2 | 7/2018 | Panergo | |

(Continued)

FOREIGN PATENT DOCUMENTS

CN 108274351 7/2018

OTHER PUBLICATIONS

Partial European Search Report for EP 21168425.3-1016, dated Oct. 29, 2021.

(Continued)

*Primary Examiner* — Joseph J Hail
*Assistant Examiner* — Shantese L McDonald
(74) *Attorney, Agent, or Firm* — The Small Patent Law Group LLC; Joseph M. Butscher

(57) ABSTRACT

An end effector for a robotic sanding system includes a sanding head including a sander configured to sand a surface of a workpiece. A motor is operatively coupled to the sander. The motor is configured to rotate the sander to sand the surface of the workpiece. The motor includes a first central longitudinal axis. A coupler is configured to removably secure the end effector to an attachment interface of an arm of the robotic sanding system. The coupler includes a second central longitudinal axis. The first central longitudinal axis is offset from the second central longitudinal axis. One or more sensors are coupled to the sanding head. The one or more sensors are configured to detect presence of a metal within the predefined range.

22 Claims, 6 Drawing Sheets

(56) References Cited

U.S. PATENT DOCUMENTS

| | | | |
|---|---|---|---|
| 11,135,612 B2* | 10/2021 | Henderson | B24B 53/013 |
| 2004/0102136 A1* | 5/2004 | Wood | B25J 17/0275 |
| | | | 451/5 |
| 2011/0130878 A1 | 6/2011 | Vila | |
| 2013/0109277 A1* | 5/2013 | Panergo | B24B 19/26 |
| | | | 901/41 |
| 2013/0273818 A1* | 10/2013 | Guan | B25J 11/0065 |
| | | | 451/340 |
| 2018/0236628 A1 | 8/2018 | Eriksen | |
| 2018/0283015 A1 | 10/2018 | Telleria | |
| 2019/0054615 A1 | 2/2019 | Ulliman | |
| 2019/0262966 A1* | 8/2019 | Scafutto Scotton | |
| | | | B25J 15/0066 |
| 2019/0275566 A1 | 9/2019 | Ponomarev | |
| 2019/0291275 A1 | 9/2019 | Szarski | |
| 2021/0394336 A1* | 12/2021 | Hemes | B24B 49/16 |

OTHER PUBLICATIONS https://www.aero-mag.com/suhner-automation-surface-finishing-robotic-technology-grinding-processautomation-machining-robotsander/.
https://gebe2-et.com/en/composite/robotic-composite-sanding/.
Extended European Search Report for EP 21168425.301916/3925732, dated Mar. 14, 2022.

* cited by examiner ated with typical in-line coupling (the in-line coupling between the motor and the attachment point of the robot limits configurability of the system, and may also limit the reach of the end effector, such as in confined areas), and issues with typical fluid systems (typically manually dispensed or coupled to a remote and dedicated fluid supply). Additionally, certain conventional robotic sanders may be susceptible to being inadvertently activated.

ROBOTIC SANDING SYSTEMS AND METHODS

FIELD OF THE DISCLOSURE

Embodiments of the present disclosure generally relate to robotic sanding systems and methods, and more particularly, to robotic sanding systems and methods including sanding end effectors.

BACKGROUND OF THE DISCLOSURE

During the manufacture of aeronautical and aerospace vehicles, various components may be sanded and cleaned before or after an assembly process. For example, mandrels, wings, fuselage sections, and/or the like may be polished and cleaned, such as via a sanding process.

Typically, robotic sanding end effectors are powered through pneumatic motors. The pneumatic motors are operably coupled to the sanding effectors to facilitate high torque and high speed sanding operations. The pneumatic motors are generally directly attached and coaxial with an attachment point of the robot, such as at an end of an arm. Other robotic sanding effectors include electric motors.

Conventional robotic sanding end effectors have various drawbacks, including the following: issues with typical pneumatic motors, issues with motors (e.g., pneumatic or electric) associated with typical in-line coupling (the in-line coupling between the motor and the attachment point of the robot limits configurability of the system, and may also limit the reach of the end effector, such as in confined areas), and issues with typical fluid systems (typically manually dispensed or coupled to a remote and dedicated fluid supply). Additionally, certain conventional robotic sanders may be susceptible to being inadvertently activated.

Further, pneumatic motors are typically coupled to a remote and dedicated air supply. For example, the pneumatic motors are coupled to a source of compressed air via one or more air delivery tubes. The pneumatic motors are configured to ensure a desired amount of force and pressure exerted by the sanding head into a workpiece. The air delivery tubes coupled between the pneumatic motor and an air supply add weight and complexity to the overall system, as well as limit the range of the system.

In short, tethering the motor of the end effector to a source of air through air delivery tubes limits the mobility of the system. Further, the in-line coupling between the motor and the attachment point of the robot limits configurability of the system, and may also limit the reach of the end effector, such as in confined areas.

SUMMARY OF THE DISCLOSURE

A need exists for a robotic sanding system having increased mobility. Further, a need exists for a robotic sanding system having increased range. Moreover, a need exists for a robotic sanding system that is able to operate in confined spaces and areas. Additionally, a need exists for a readily configurable robotic sanding system. Also, a need exists for a sanding system having increased reach, such as can be positioned in confined areas. Further, a need exists for a sanding system having a securely contained fluid supply. Also, a need exists for a sanding system that is not susceptible to being inadvertently activated.

With those needs in mind, certain embodiments of the present disclosure provide an end effector for a robotic sanding system. The end effector includes a sanding head including a sander configured to sand a surface of a workpiece, and a motor operatively coupled to the sander. The motor is configured to rotate the sander to sand the surface of the workpiece. In at least one embodiment, a coupler is configured to removably secure the end effector to an attachment interface of an arm of the robotic sanding system. The motor includes a first central longitudinal axis. The coupler includes a second central longitudinal axis. In at least one embodiment, the first central longitudinal axis is offset from the second central longitudinal axis. In at least one embodiment, the end effector further includes one or more sensors coupled to the sanding head. The one or more sensors are configured to detect presence of a metal within the predefined range. As an example, the motor is prevented from activation in response to the metal being outside of the predefined range.

In at least one embodiment, the motor is an electric motor contained within the end effector.

In at least one embodiment, the sanding head further includes one or more brushes configured to capture one or more of debris or cleaning fluid.

In at least one embodiment, the end effector also includes a force compliance sub-system configured to ensure that the sanding head engages the workpiece with a predetermined force. For example, the force compliance sub-system includes rods, ball joints, linear slides that slidably retain the rods, and springs coupled to the rods and ball joints. The ball joints, the linear slides, and the springs cooperate to allow the sanding head to angularly and linearly comply with surfaces of the workpiece.

In at least one embodiment, the end effector also includes a fluid delivery sub-system configured to dispense cleaning fluid onto one or both of the sander or the workpiece. For example, the fluid delivery sub-system includes a first fluid container retaining a cleaning agent, a second fluid container retaining a mixing fluid (such as water), a mixing chamber fluidly coupled to the first fluid container and the second fluid container, wherein the cleaning agent and the mixing fluid are combined in the mixing chamber to form the cleaning fluid, a fluid outlet fluidly coupled to the mixing chamber, wherein the cleaning fluid is dispensed out of the fluid outlet, and one or more pumps operatively coupled to one or more of the first fluid container, the second fluid container, or the mixing chamber. The one or more pumps are configured to pump the cleaning agent and the mixing fluid to the mixing chamber, and the cleaning fluid out of the fluid outlet onto one or both of the sander or the workpiece.

Certain embodiments of the present disclosure provide a robotic sanding system including one or more arms, one or more actuators operatively coupled to the one or more arms, and an end effector coupled to the one or more arms, as described herein.

Certain embodiments of the present disclosure provide a robotic sanding method that includes providing an end effector with a sanding head including a sander configured to sand a surface of a workpiece. An electric motor is coupled to the sander within the end effector. One or more sensors are coupled to the sanding head. The one or more sensors are configured to detect presence of a metal within a predefined range. The robotic sanding method also includes preventing activation of the electric motor in response to the metal being outside of the predefined range.

In at least one embodiment, the electric motor includes a first central longitudinal axis. A coupler removably secures the end effector to an attachment interface of an arm of a robotic sanding system. The coupler includes a second central longitudinal axis that is offset from the first central longitudinal axis.

Certain embodiments of the present disclosure provide a robotic sanding method, including providing an end effector with a sanding head including a sander configured to sand a surface of a workpiece; operatively coupling an electric motor to the sander within the end effector, wherein the electric motor comprises a first central longitudinal axis; removably securing a coupler of the end effector to an attachment interface of an arm of a robotic sanding system, wherein the coupler comprises a second central longitudinal axis; offsetting the first central longitudinal axis from the second central longitudinal axis; coupling one or more sensors to the sanding head, wherein the one or more sensors are configured to detect presence of metal within a predefined range; and preventing activation of the electric motor in response to the metal being outside of the predefined range.

In at least one embodiment, the robotic sanding method also includes providing the sanding head with one or more brushes configured to capture one or more of debris or cleaning fluid.

In at least one embodiment, the robotic sanding method also includes ensuring, by a force compliance sub-system, that the sanding head engages the workpiece with a predetermined force.

In at least one embodiment, the robotic sanding method also includes dispensing, by a fluid delivery sub-system, cleaning fluid onto one or both of the sander or the workpiece. In at least one embodiment, said dispensing includes retaining a cleaning agent within a first fluid container; retaining water within a second fluid container; fluidly coupling a mixing chamber to the first fluid container and the second fluid container; combining the cleaning agent and the water in the mixing chamber to form a cleaning fluid; coupling a fluid outlet to the mixing chamber; and dispensing the cleaning fluid out of the fluid outlet. In at least one embodiment, said dispensing also includes operatively coupling one or more pumps to one or more of the first fluid container, the second fluid container, or the mixing chamber; and pumping, by the one or more pumps, the cleaning agent and the water to the mixing chamber, and the cleaning fluid out of the fluid outlet onto one or both of the sander or the workpiece.

DETAILED DESCRIPTION OF THE DISCLOSURE

Figure 1:
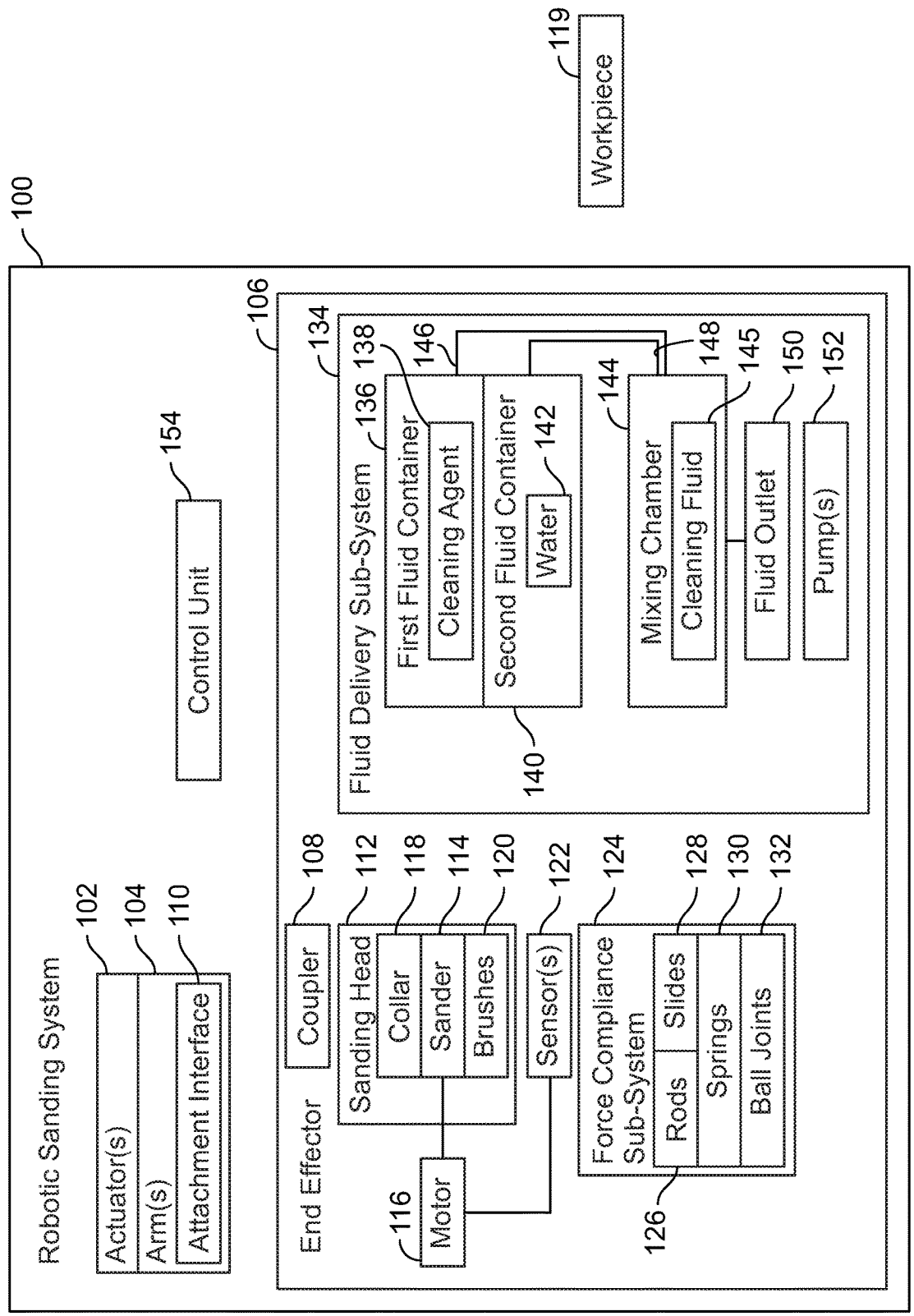
FIG. 1 illustrates a schematic block diagram of a robotic sanding system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain embodiments of the present disclosure provide a sanding end effector for a robotic sanding system. The end effector is lightweight and provides increased reach and range for the robotic sanding system. The robotic sanding system including the end effector is particularly well-suited for sanding and/or cleaning various components of aeronautical and aerospace structures, such as curved fuselages, wings, mandrels, and the like.

In certain embodiments, the robotic sanding system includes an electric motor coupled to a sanding head. The electric motor allows the end effector to be untethered from an air supply, thereby decreasing the weight of the end effector and the robotic sanding system, and improving mobility. The end effector is configured to be removably coupled to an attachment interface of an arm of the robotic system, such as through a modular coupler. The modular coupler allows the end effector to be removed from the arm without portions of the end effector remaining on the arm.

Certain embodiments of the present disclosure provide an end effector for a robotic sanding system. The end effector includes an extension plate. An attachment interface connects to a tool flange of an arm of the robotic sanding system. The attachment interface is removably coupled to the extension plate. The end effector also includes a sanding head, an electric motor coupled to the sanding head and configured to drive the sanding head, and one or more one or more sensors (such as inductive sensors) that are configured to prevent rotation of a sander of the sanding head unless the sanding head is in contact with a metal surface. In at least one embodiment, an onboard dispensing system is configured to combine liquid and cleaning agent in a predefined ratio and dispense the combined liquid on a surface of a workpiece. In at least one embodiment, the end effector also includes angular and linear compliance sub-system configured to allow the sanding head to be compliant with a curved surface of the workpiece and maintain a threshold force on the curved workpiece. As an example, the angular and linear compliance system includes a plurality of ball joints and springs coupled to the sanding head.

As described herein, a robotic sanding system includes an end effector including a sanding head including a sander configured to sand a surface of a workpiece, and a motor operatively coupled to the sander. The motor is configured to rotate the sander to sand the surface of the workpiece.

FIG. 1 illustrates a schematic block diagram of a robotic sanding system 100, according to an embodiment of the present disclosure. The robotic sanding system 100 includes one or more actuators 102 operatively coupled to one or more arms 104. The one or more actuators 102 may be electric, hydraulic, pneumatic, or other such motors that are configured to move the arm(s) 104.

An end effector 106 is coupled to a distal end of the arm 104. The end effector 106 includes a coupler 108 that is configured to removably secure the end effector 106 to an attachment interface 110 of the arm 104. The attachment interface 110 may be a tool flange. For example, the coupler 108 includes clamps, latches, plugs, sockets, electrical interfaces, and/or the like that removably couple to reciprocal features of the attachment interface 110. In this manner, the end effector 106 may be selectively secured to, and removed from, the arm 104.

The end effector 106 also includes a sanding head 112 that includes a sander 114 operatively coupled to a motor 116. In at least one embodiment, the motor 116 is an electric motor contained within the end effector 106. The end effector 106 includes the motor 116, instead of a separate and distinct pneumatic motor connecting to the sanding head 112 through air delivery tubes. As such, the end effector 106 is not tethered to an air supply through one or more air delivery lines. Further, the end effector 106 may be isolated and removed from the arm 104, as the motor 116 is onboard the end effector 106 instead of on or within the arm 104 and/or connected to pneumatic lines secured to the arm 104 or other portions of the robotic sanding system 100.

The sander 114 is rotatably coupled to a collar 118 of the sanding head 112. The collar 118 provides a shroud, cover, or housing in, on, and/or to which the sander 114 is rotatably secured. In at least one embodiment, the motor 116 is mounted over the collar 118. In operation, the sander 114 is rotated at high speed and torque through the motor 116 to sand or otherwise polish a workpiece 119, such as a metal component. The workpiece 119 may be a mandrel, wing, portion of a fuselage of an aircraft of aerospace vehicle, for example. Optionally, the workpiece 119 may be various other components, whether or not part of an aeronautical or aerospace vehicle, which are configured to be sanded, polished, smoothed, cleaned, and/or the like. For example, embodiments of the present disclosure may be used in relation to components in vehicles (such as aircraft, spacecraft, land vehicles, sea vehicles), fixed structures (such as within residential or commercial buildings), or the like.

The sanding head 112 may also include one or more brushes 120 coupled to the sander 114. The brushes 120 may be secured around a circumference of the sander 114. As another example, the brushes may overlay a top of the sander 114. The brushes 120 are configured to capture one or both of excess cleaning fluid and/or debris that may be generated during a sanding operation. Alternatively, the sanding head 112 may not include the collar 118 and/or the brushes 120.

The end effector 106 also includes a plurality of sensors 122, which are coupled to a portion of the sanding head 112. The sensors 122 may be inductive sensors that are secured to the collar 118, such as around a circumference the collar 118. The sensors 122 are configured to detect presence of metal within a predefined range, such as 10 millimeters or less. Optionally, the predefined range may be less than 10 millimeters, such as 5 millimeters, or greater than 10 millimeters, such as 100 millimeters. The sensors 122 are operatively coupled to the motor 116, such as through one or more relays.

In operation, the sensors 122 prevent the motor 116 from operating when the sanding head 112 is outside of the predefined range of the workpiece 119. For example, the motor 116 is prevented from activation in response to metal of the workpiece 119 being outside of the predefined range. If a portion of the workpiece 119 (such as a metal portion) is within the predefined range of all of the sensors 122, the motor 116 may activate and operate to rotate the sander 114 to sand the workpiece 119. If, however, the workpiece 119 is outside of the predefined range of at least one of the sensors 122, the motor 116 is prevented from activating or is deactivated. In at least one embodiment, the sensors 122 prevent rotation of the sander 114 unless the sander 114 is in contact with a metal surface of the workpiece 119.

In at least one embodiment, the end effector 106 also includes a force compliance sub-system 124 that is configured to ensure that the sanding head 112 engages the workpiece 119 with predetermined force. The force compliance sub-system 124 provides linear and angular compliance in relation to the workpiece 119, thereby allowing the sanding head 112 to comply with a surface (whether flat or arcuate) of the workpiece 119 and maintain a predetermined threshold force on the surface. The force compliance sub-system 124 also causes the sanding head 112 to maintain a predefined nominal pressure in relation to the workpiece 119. As described herein, the force compliance sub-system 124 includes rods, ball joints, linear bearings, and springs, which cooperate to allow the sanding head 112 to angularly and linearly comply and conform with respect to variable surfaces (such as flat, curved, and the like) surfaces of the workpiece 119.

For example, the force compliance sub-system 124 incudes a plurality of rods 126 coupled to the sanding head 112. The rods 126 include first ends slidably coupled to linear bearings, such as linear slides 128, and second ends coupled to the sanding head 112 (such as coupled to the collar 118). Springs 130 (for example, compression springs) are secured around the rods 126 and are compressed between the sanding head 112 and another portion of the end effector 106, such as a portion of a housing. The springs 130 (for example, compression springs) are configured to exert a desired linear force into the sanding head 112, thereby ensuring that the sander 114 exerts the desired linear force into the workpiece 119. The rods 126 linearly slide into and out from the linear slides 128 based on the shape of the workpiece 119 as the sanding head 112 moves thereover. As such, the rods 126 cooperate with the linear slides 128 and the springs 130 to provide linear force compliance with the workpiece 119 (in contrast to pneumatic actuators).

Figure 8:
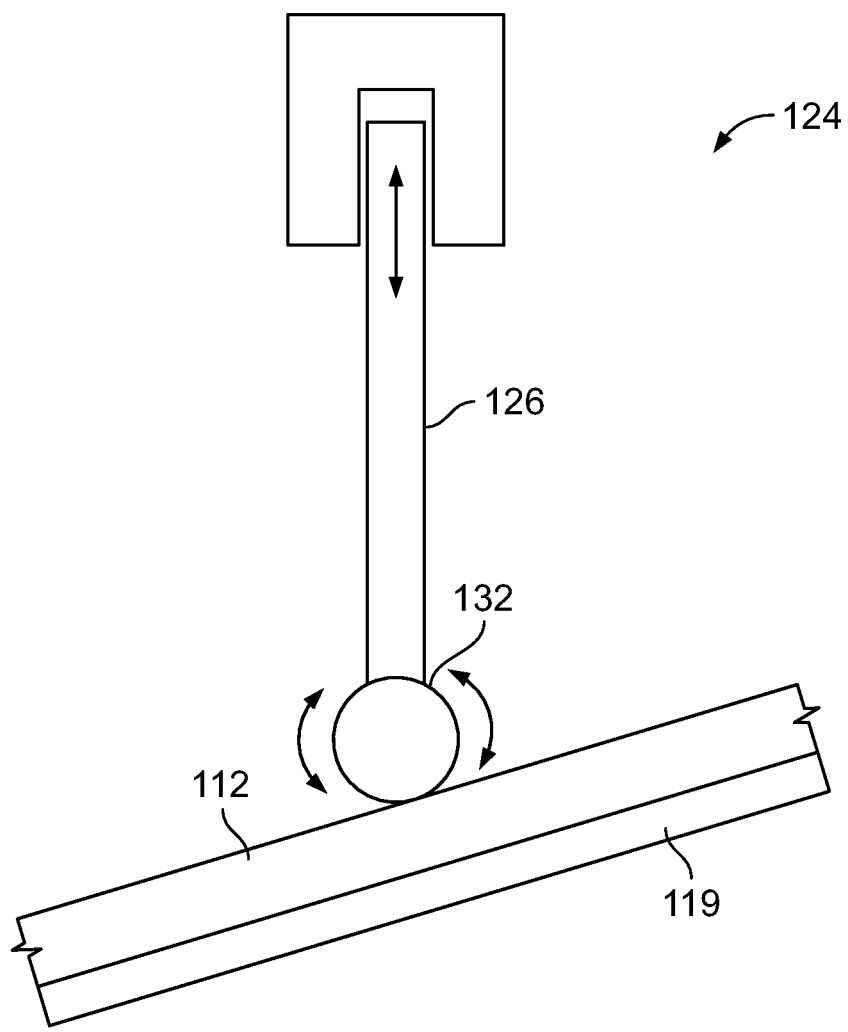
FIG. 8 illustrates a simplified schematic diagram of a rod, ball joint, and linear slide cooperating to allow a sanding head to angularly and linearly comply with surface of a workpiece, according to an embodiment of the present disclosure.

The force compliance sub-system 124 also includes ball joints 132 coupled to the second ends of the rods 126. The ball joints 132 allow the sanding head 112 to radially pivot. In this manner (as shown in FIG. 8, for example) the ball joints 132 cooperate with the rods 126 to provide angular force compliance with the workpiece 119 (in contrast to pneumatic actuators).

The springs 130 are selected to have a desired spring force constant. As such, the springs 130 ensure that the sanding head 112 maintains a desired threshold force with the surface of the workpiece 119.

Alternatively, instead of (or in addition to) the rods 126, slides, springs 130, and ball joints, the force compliance sub-system 124 may include various other structures and mechanisms. For instance, other compliance mechanism are possible to ensure that the sanding head 112 provide force compliance with the workpiece 119. For example, a known compliance mechanism that may be included in the force compliance sub-system 124 includes a gimbal and four bar linkage. Alternatively, the end effector 106 may not include the force compliance sub-system 124.

In at least one embodiment, in contrast to known methods that typically require manual dispensing of cleaning fluids, the end effector 106 also includes a fluid delivery sub-system 134 that is configured to dispense cleaning fluid onto the sander 114 and/or the workpiece 119. The fluid delivery sub-system 134 is onboard the end effector 106. As such, the fluid delivery sub-system 134 allows for automatic dispensing of cleaning fluid with no manual intervention. Further, the fluid delivery sub-system 134 onboard the end effector 106 leads to less fluid waste, less cleaning, and less purging, as compared to tubing that would typically supply fluid along the arm 104.

The fluid delivery sub-system 134 includes a first fluid container 136 that retains a cleaning agent 138, such as a liquid soap, detergent, solvent, and/or the like. The fluid delivery sub-system 134 also includes a second fluid container 140 that retains a mixing fluid, such as water 142. The first fluid container 136 and the second fluid container 140 are fluidly coupled to a mixing chamber 144, such as through a first fluid delivery line 146 (such as a first flexible tube), and a second fluid delivery line 148 (such as a second flexible tube), respectively. The mixing chamber 144 is also fluidly coupled to a fluid outlet 150 (such as a nozzle).

One or more pumps 152 (such as peristaltic pumps) are operatively coupled to the first fluid container 136, the second fluid container 140, and/or the mixing chamber 144. The one or more pumps 152 operate to pump the cleaning agent 138 and the water 142 to the mixing chamber 144, where the cleaning agent 138 and the water 142 are mixed into a predefined ratio (such as a water to cleaning agent ratio of 10:1), and the combined, mixed fluid (that is, the cleaning agent 138 and the water 142 mixed into the predefined ratio) is dispensed out through the fluid outlet 150 and onto the sander 114 and/or the workpiece 119. In this manner, the sander 114 may also be used to clean the workpiece 119 as the sander 114 is moved thereover. The one or more pumps 152 operate to dispense the combined, mixed fluid (that is, the cleaning fluid 145) onto the workpiece 119. Further, the one or more pumps 152 move the fluids through the fluid delivery sub-system 134, thereby eliminating, minimizing, or otherwise reducing the need for cleaning and purging tubing. Alternatively, the end effector 106 may not include the fluid delivery sub-system 134.

As described, the cleaning agent 138 and the water 142 are combined in the mixing chamber 144 to form a cleaning fluid 145, which is the cleaning agent 138 and the water 142 combined together at a desired ratio. The cleaning fluid 145 is dispensed out of the fluid outlet. The one or more pumps 152 are operatively coupled to the first fluid container 136, the second fluid container 140, and/or the mixing chamber 144. The one or more pumps 152 are configured to pump the cleaning agent 138 and the water 142 to the mixing chamber 144, and the cleaning fluid 145 out of the fluid outlet 150 onto one or both of the sander 114 and/or the workpiece 119.

In at least one embodiment, a control unit 154 is configured to control operation of the robotic sanding system 100. The control unit 154 may be contained within the end effector 106, for example. In at least one other example, the control unit 154 may be remotely located from the end effector 106. For example, the control unit 154 may be part of a computer workstation that is in communication with various components of the robotic sanding system 100, such as through one or more wired or wireless connections.

The control unit 154 is in communication with the actuator 102, such as through one or more wired or wireless connections. The control unit 154 is configured to operate the actuator 102 to operate the arm(s) 104. For example, the control unit 154 operates the actuator 102 to move the end effector 106 in relation to the workpiece 119 so that the sander 114 abuts against the workpiece 119.

In at least one embodiment, the control unit 154 is also in communication with the motor 116, such as through one or more wired or wireless connections. As such, the control unit 154 may be configured to be operate the motor 116.

The control unit 154 may also be in communication with the sensors 122, such as through one or more wired or wireless connections. The control unit 154 may receive detection signals output by the sensors 122. The detection signals indicate whether or not the workpiece 119 is in the predefined range of the sensors 122. As such, the control unit 154 may operate the motor 116 based on the received detection signals. If all of the detection signals indicate that the workpiece 119 is within the predefined range, the control unit 154 may activate or maintain activation of the motor 116 so that the sander 114 operates on the workpiece 119. If, however, at least one of the detection signals indicates that the workpiece 119 is outside of the predefined range (that is, the sensors 122 do not detect metal), the control unit 154 may deactivate or prevent activation of the motor 116. Alternatively, the control unit 154 may not be in communication with the motor 116. Instead, the sensors 122 may be operatively coupled to the motor 116 through one or more relays or other such components, as described above.

The control unit 154 may also be in communication with the one or more pumps 152, such as through one or more wired or wireless connections. The control unit 154 may operate the one or more pumps 152 to dispense the combined cleaning fluid onto the sander 114, the brushes 120, and/or the workpiece 119.

Figure 2:
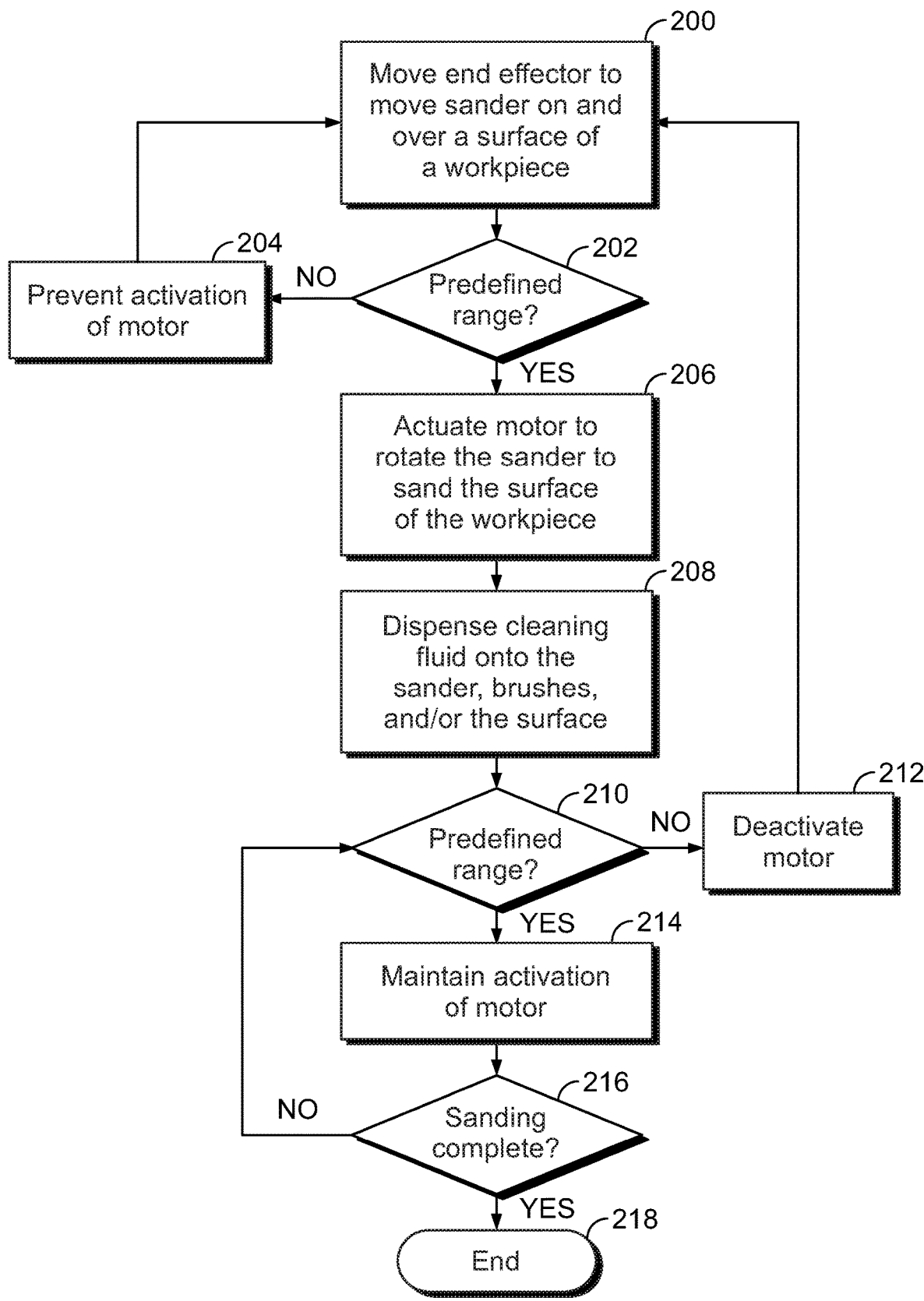
FIG. 2 illustrates a flow chart of a robotic sanding method, according to an embodiment of the present disclosure.

FIG. 2 illustrates a flow chart of a robotic sanding method, according to an embodiment of the present disclosure. Referring to FIGS. 1 and 2, in operation, the actuator 102 is controlled (such as through the control unit 154) to move the end effector 106 via the arm(s) 104 so that the sander 114 is moved onto and over the workpiece 119 at 200. For example, at 200, the end effector 106 is moved to move the sander 114 on and over a surface of the workpiece 119.

At 202, it is determined if the surface of the workpiece 119 is within the predefined range of the sensors 122. If the surface is not within the predefined range of one or more of the sensors 122, the method proceeds from 202 to 204, at which activation of the motor 116 is prevented. If, however, the surface is within the predefined range of the sensors 122, the method proceed from 202 to 206, at which the motor 116 is activated to rotate the sander 114 to sand the surface of the workpiece 119.

At 208, cleaning fluid (which is the cleaning agent 138 and the water 142 combined and mixed at the predefined ratio) is dispensed onto one or more of the sander 114, the brushes 120, and/or the surface of the workpiece 119 to sanitize or otherwise clean the surface of the workpiece 119 as it is being sanded. Alternatively, the method may not include 208.

As the sander 114 is operated to sand the surface, it is determined at 210 if the surface of the workpiece 119 is still within the predefined range of the sensors 122. If not, the method proceeds to 212, at which the motor 116 is deactivated, and the method returns to 200. If, however, the surface of the workpiece 119 is still within the predefined range of the sensors 122, the method proceeds from 210 to 214, at which the motor 116 remains activated so that the sander 114 continues to sand the surface of the workpiece 119.

At 216, it is determined if the sanding operation is complete. If not, the method returns to 210. If, however, the sanding operation is complete, the method ends at 218.

In some examples, the determination of whether the surface of the workpiece 119 is within the predefined range of the sensors 122 occurs before the end effector 106 is operated to move the sanding head 112 on and over a surface of the workpiece 119. In this manner, inadvertent operation of the sanding head 112 (for example, when the sanding head 112 is not over the workpiece) can be avoided.

As used herein, the term "control unit," "central processing unit," "unit," "CPU," "computer," or the like can include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 154 can be or include one or more processors that are configured to control operation thereof, as described herein.

The control unit 154 is configured to execute a set of instructions that are stored in one or more data storage units or elements (such as one or more memories), in order to process data. For example, the control unit 154 can include or be coupled to one or more memories. The data storage units can also store data or other information as desired or needed. The data storage units can be in the form of an information source or a physical memory element within a processing machine. The one or more data storage units or elements can comprise volatile memory or nonvolatile memory, or can include both volatile and nonvolatile memory. As an example, the nonvolatile memory can comprise read only memory (ROM), programmable ROM (PROM), electrically programmable ROM (EPROM), electrically erasable PROM (EEPROM), and/or flash memory and volatile memory can include random access memory (RAM), which can act as external cache memory. The data stores of the disclosed systems and methods is intended to comprise, without being limited to, these and any other suitable types of memory.

The set of instructions can include various commands that instruct the control unit 154 as a processing machine to perform specific operations such as the methods and processes of the various embodiments of the subject matter described herein. The set of instructions can be in the form of a software program. The software can be in various forms such as system software or application software. Further, the software can be in the form of a collection of separate programs, a program subset within a larger program or a portion of a program. The software can also include modular programming in the form of object-oriented programming. The processing of input data by the processing machine can be in response to user commands, or in response to results of previous processing, or in response to a request made by another processing machine.

The diagrams of embodiments herein can illustrate one or more control or processing units, such as the control unit 154. It is to be understood that the processing or control units can represent circuits, circuitry, or portions thereof that can be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the control unit 154 can represent processing circuitry such as one or more of a field programmable gate array (FPGA), application specific integrated circuit (ASIC), microprocessor(s), and/or the like. The circuits in various embodiments can be configured to execute one or more algorithms to perform functions described herein. The one or more algorithms can include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 3:
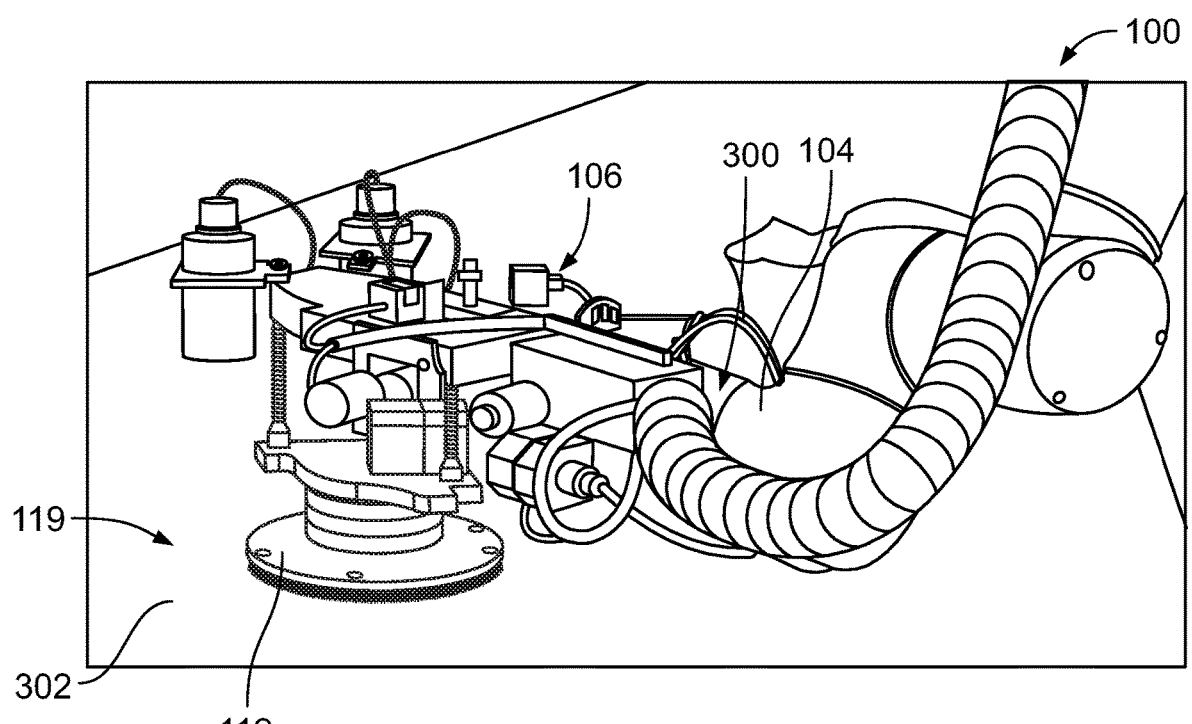
FIG. 3 illustrates a perspective lateral view of the robotic sanding system operating on a workpiece, according to an embodiment of the present disclosure.

FIG. 3 illustrates a perspective lateral view of the robotic sanding system 100 operating on the workpiece 119, according to an embodiment of the present disclosure. The end effector 106 is secured to a distal end 300 of the arm 104. The arm 104 is operated to move the sanding head 112 onto a surface 302 of the workpiece 119.

Figure 4:
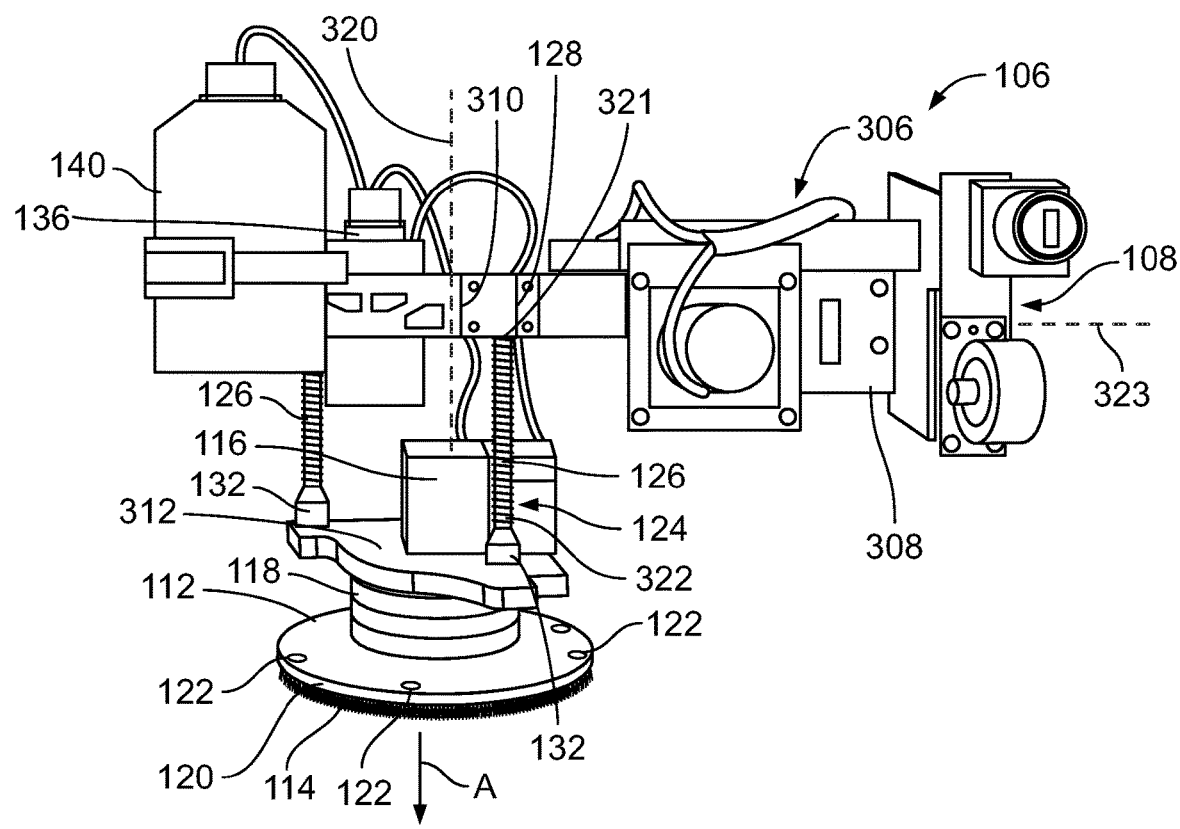
FIG. 4 illustrates a perspective lateral view of an end effector, according to an embodiment of the present disclosure.

FIG. 4 illustrates a perspective lateral view of the end effector 106, according to an embodiment of the present disclosure. The end effector 106 includes a housing 306, such as one or more brackets, walls, beams, and/or the like. The housing 306 includes a first end 308 secured to the coupler 108, and a second end 310 secured to the sanding head 112. The coupler 108 removably secures to the attachment interface 110 of the arm 104 (shown in FIG. 1).

In at least one embodiment, the sanding head 112 includes or is coupled to a support plate 312, which may be part of, or is otherwise connected to, the collar 118. The motor 116 is secured to the support plate 312 and is operatively coupled to the sander 114. The brushes 120 may overlay the sander 114. Optionally, the brushes 120 may secure around a circumference of the sander 114.

The force compliance sub-system 124 includes the rods 126 having first ends 321 slidably retained within linear slides 128 secured to the housing 306, and second ends 322 coupled to the ball joints 132 that are rotatably coupled to the support plate 312. The springs 130 are secured around the rods 126 and are compressed between the housing 306 and the ball joints 132 (or optionally the support plate 312). Accordingly, the springs 130 exert a linear resistive force into the sanding head 112 that urges the sanding head 112 linearly in the direction of arrow A, thereby ensuring linear force compliance with the workpiece 119 (shown in FIGS. 1 and 3). The ball joints 132 allow the sanding head 112 to pivot thereabout. As such, the ball joints 132 ensure angular force compliance with the workpiece 119. As shown, the force compliance sub-system 124 may include three rods 126, three springs 130, and three ball joints 132. Optionally, the force compliance sub-system 124 may include less or more than three rods 126, springs 130, and ball joints 132 (such as one, two, four, or five rods 126, springs 130, and ball joints).

The first fluid container 136 and the second fluid container 140 are secured to the housing 306. For example, the first fluid container 136 and the second fluid container 140 may be secured to the housing 306 such as through clamps, adhesives, fasteners, and/or the like. As another example, the first fluid container 136 and the second fluid container 140 may be disposed within an internal chamber of the housing 306.

A central longitudinal axis 320 of the motor 116 is not coaxial with a central longitudinal axis 323 of the coupler 108. As such, the end effector 106 secures to the arm 104 at a different orientation than which the motor 116 rotates the sander 114. As shown in FIG. 4, the central longitudinal axis 320 may be orthogonal to the central longitudinal axis 323. In at least one embodiment, the central longitudinal axis 320 is the rotation axis about which the sander 114 rotates.

The sensors 122 may be coupled around lateral surfaces of the collar 118. For example, the end effector 106 may include three or more sensors 122 secured to an outer circumference of the collar 118 at regular intervals. Optionally, the sensors 122 may be secured to lower surfaces of the collar 118, and/or the support plate 312. As another example, the end effector 106 may include less or more than three sensors 122.

Figure 5:
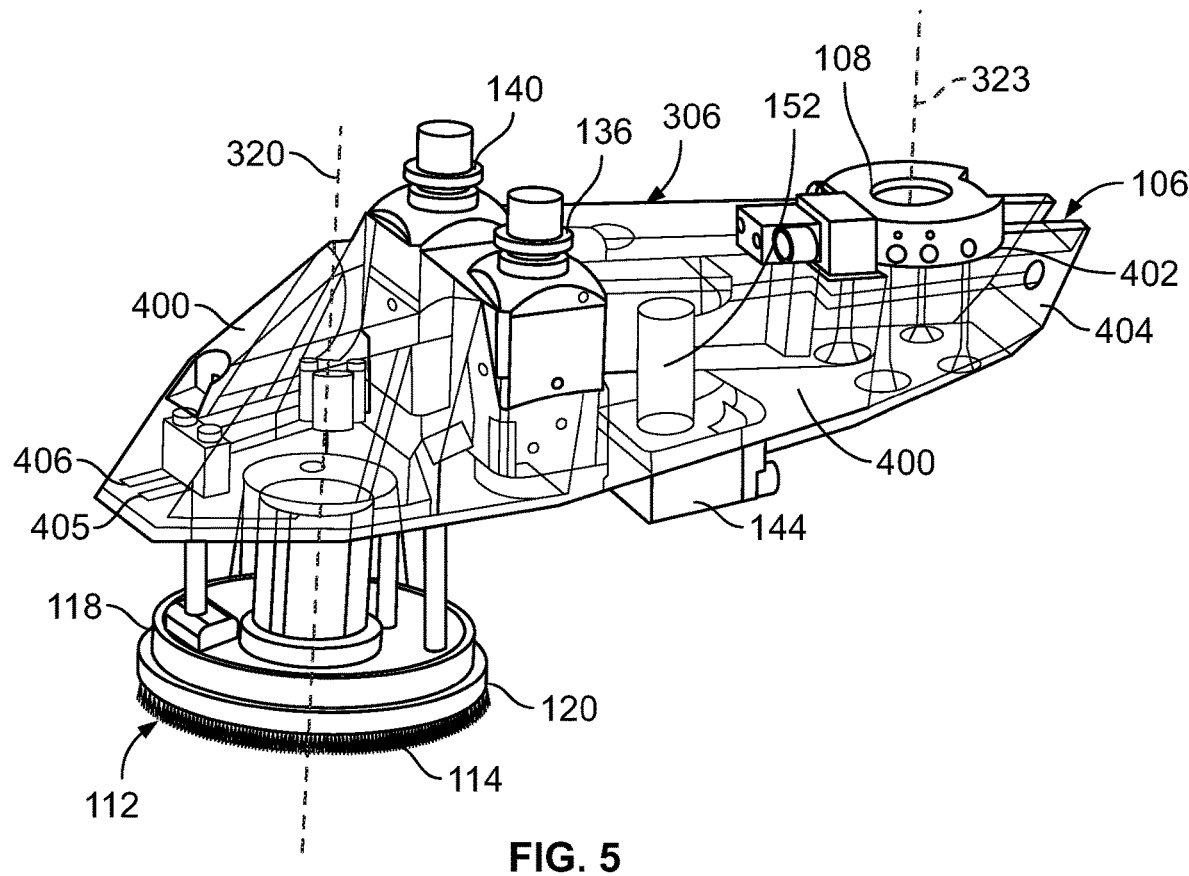
FIG. 5 illustrates a perspective lateral view of an end effector, according to an embodiment of the present disclosure.

FIG. 5 illustrates a perspective lateral view of an end effector 106, according to an embodiment of the present disclosure. The end effector 106 may differ in size, shape, and/or configuration than the end effector 106 shown in FIGS. 3 and 4. As shown in FIG. 5, the housing 306 may include a plurality of walls 400 that contain various components of the end effector 106.

In the embodiment shown in FIG. 5, the coupler 108 is mounted on a top surface 402 of a first end 404 of the end effector 106, and the sanding head 112 extends from a lower surface 405 of a second end 406 (opposite from the first end 404) of the end effector 106. As such, the central longitudinal axis 320 of the motor 116 is separated and offset from the central longitudinal axis 323 of the coupler 108. As shown in FIG. 5, the central longitudinal axis 320 and the central longitudinal axis 323, while separate and offset from one another, may be parallel. For example, the central longitudinal axis 320 may be separated from the central longitudinal axis 323 by 36 inches or less, such as 24 inches or less, or 12 inches. Optionally, the central longitudinal axis 320 may be separated from the central longitudinal axis 323 by a distance greater than 36 inches. The offset configuration improves the reach of the sanding head 112 and allows for improved ability to place the center of the sander 114 at a desired location. In at least one embodiment, the central longitudinal axis 320 is the rotation axis about which the sander 114 rotates.

The configuration shown in FIG. 5, in which the sanding head 112 and the coupler 108 are at opposite ends of the end effector 106, provide a more mobile and manipulatable sanding head 112. For example, the end effector 106 may be pivoted and rotated about the central longitudinal axis 323 to allow the sanding head 112 to be swung into confined spaces that may not otherwise be large enough to accommodate a sanding head that is coupled to a motor that is coaxial with a coupler. In this manner, embodiments of the present disclosure provide an end effector 106 that is configured to efficiently and effectively operate on complex surfaces.

Figure 6:
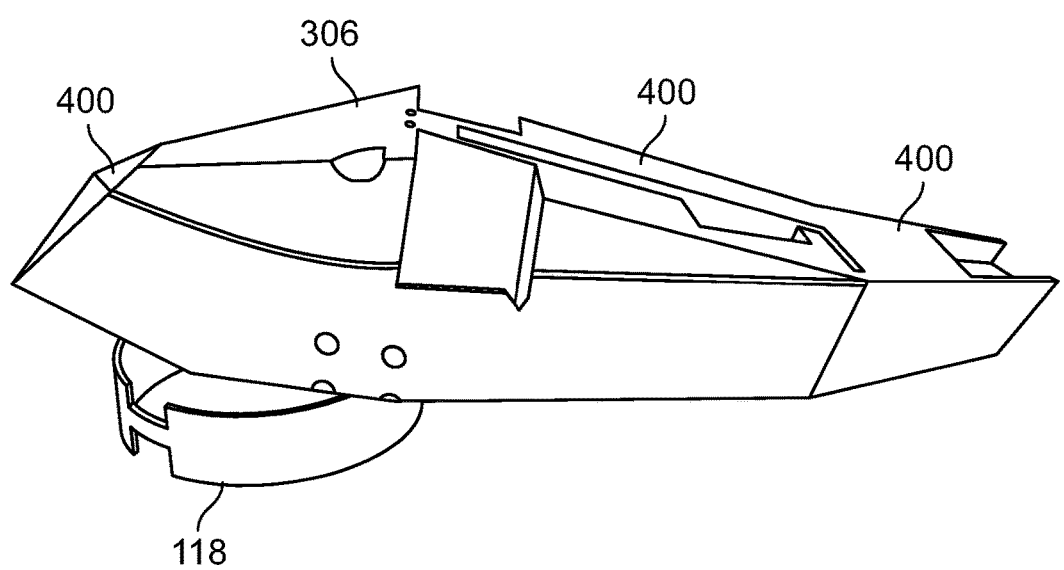
FIG. 6 illustrates a perspective lateral view of a housing and a collar, according to an embodiment of the present disclosure.

FIG. 6 illustrates a perspective lateral view of the housing 306 and the collar 118, according to an embodiment of the present disclosure. The housing 306 and the collar 118 may be formed of plastic, for example. In at least one embodiment, the housing 306 and the collar 118 may be formed through three-dimensional (3D) printing. The printed housing 306 and the collar 118 reduce overall weight of the end effector 106 (in contrast to metal structures). Optionally, the housing 306 and the collar 118 may be formed of metal.

Figure 7:
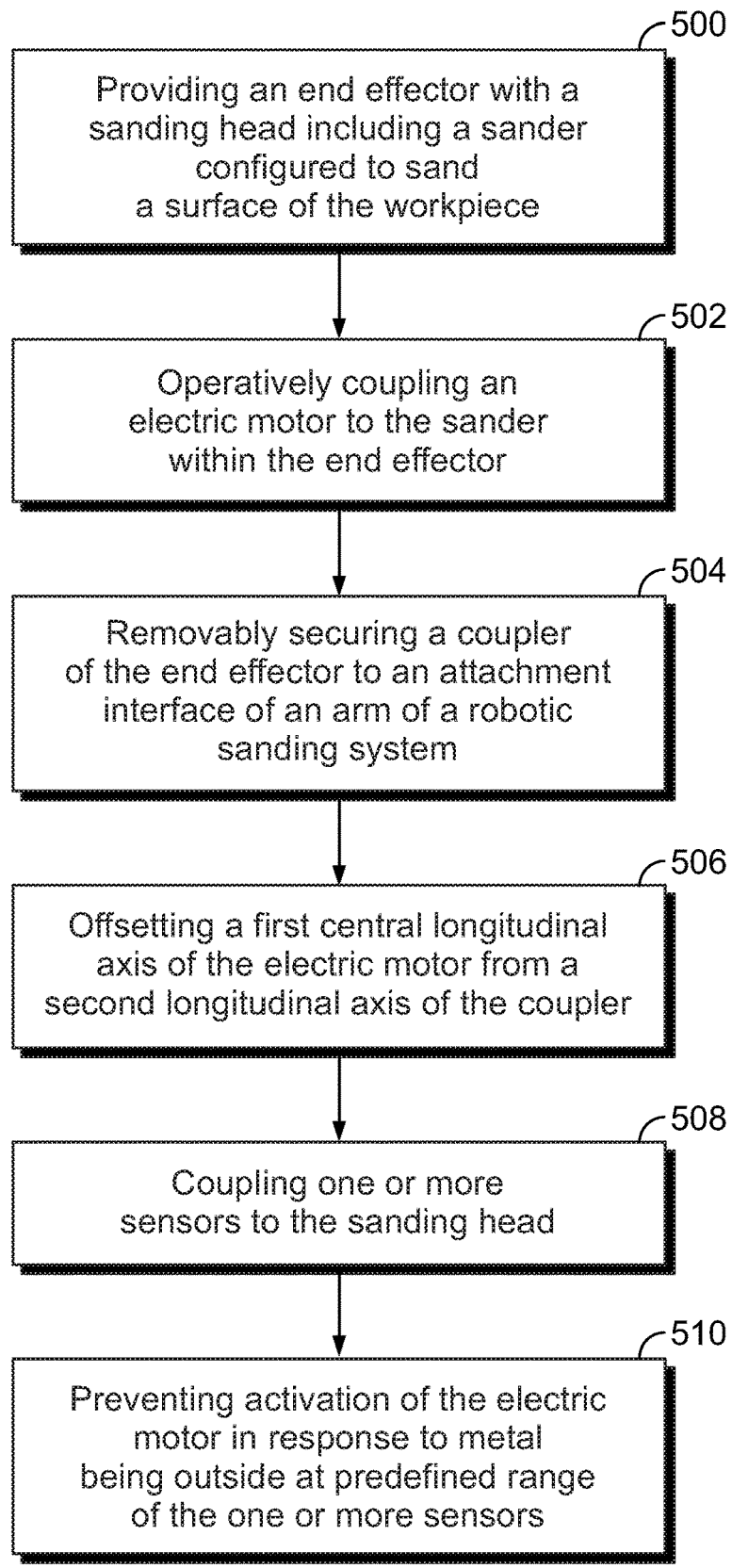
FIG. 7 illustrates a flow chart of a robotic sanding method, according to an embodiment of the present disclosure.

FIG. 7 illustrates a flow chart of a robotic sanding method, according to an embodiment of the present disclosure. Referring to FIGS. 1 and 7, the robotic sanding method includes, at 500, providing the end effector 106 with the sanding head 112 including the sander 114 configured to sand a surface of the workpiece 119. The robotic sanding method also includes, at 502, operatively coupling the electric motor 116 to the sander 114 within the end effector 106. The electric motor 116 includes the first central longitudinal axis 320. The robotic sanding method also include, at 504, removably securing the coupler 108 of the end effector 106 to the attachment interface 110 of an arm 104 of the robotic sanding system 100. The coupler 108 includes the second central longitudinal axis 323. The robotic sanding method also includes, at 506, offsetting the first central longitudinal axis 320 from the second central longitudinal axis 323. The robotic sanding method also includes, at 508, coupling the one or more sensors 122 to the sanding head 112. The one or more sensors 122 are configured to detect presence of metal within a predefined range. The robotic sanding method also includes, at 510, preventing activation of the electric motor 116 in response to the metal being outside of the predefined range.

In an example, the steps of the robotic sanding method illustrated in FIG. 7 are carried out by an end effector, such as the end effector 106. In an example, the steps of the robotic sanding method illustrated in FIG. 7 are carried out by the end effector 106, where the motor 116 is an electric motor.

In an example, the robotic sanding method also includes providing the sanding head 112 with one or more brushes 120 configured to capture one or more of debris or cleaning fluid.

In an example, the robotic sanding method also includes ensuring, by the force compliance sub-system 124, that the sanding head 112 engages the workpiece 119 with a predetermined force.

In an example, the robotic sanding method also includes dispensing, by the fluid delivery sub-system 134, cleaning fluid 145 onto one or both of the sander 114 or the workpiece 119. In an example, said dispensing includes retaining the cleaning agent 138 within the first fluid container 136; retaining water 142 within the second fluid container 140; fluidly coupling the mixing chamber 144 to the first fluid container 136 and the second fluid container 140; combining the cleaning agent 138 and the water 142 in the mixing chamber 144 to form the cleaning fluid 145; coupling the fluid outlet 150 to the mixing chamber 144; and dispensing the cleaning fluid 145 out of the fluid outlet 150. In an example, said dispensing also includes operatively coupling the one or more pumps 152 to one or more of the first fluid container 136, the second fluid container 140, or the mixing chamber 144; and pumping, by the one or more pumps 152, the cleaning agent 138 and the water 142 to the mixing chamber 144, and the cleaning fluid 145 out of the fluid outlet 150 onto one or both of the sander 114 or the workpiece 119.

As described herein, embodiments of the present disclosure provide robotic sanding systems having increased mobility and increased range. Moreover, embodiments of the present disclosure provide robotic sanding systems having end effectors that are able to operate in confined spaces and areas.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An end effector for a robotic sanding system, the end effector comprising:
   a sanding head including a sander configured to sand a surface of a workpiece;
   a motor operatively coupled to the sander, wherein the motor is configured to rotate the sander to sand the surface of the workpiece, wherein the motor comprises a first central longitudinal axis;
   a coupler configured to removably secure the end effector to an attachment interface of an arm of the robotic sanding system, wherein the coupler comprises one or more of clamps, latches, plugs, sockets, or electrical interfaces that removably couple to reciprocal features of the attachment interface, wherein the coupler further comprises a second central longitudinal axis, and wherein the first central longitudinal axis is offset from the second central longitudinal axis; and
   one or more sensors coupled to the sanding head, wherein the one or more sensors are configured to detect presence of a metal within a predefined range.

2. The end effector of claim 1, wherein the motor is an electric motor contained within the end effector.

3. The end effector of claim 1, wherein the sanding head further comprises one or more brushes configured to capture one or more of debris or cleaning fluid.

4. The end effector of claim 1, wherein the motor is prevented from activation in response to the metal being outside of the predefined range.

5. The end effector of claim 1, further comprising a force compliance sub-system configured to ensure that the sanding head engages the workpiece with a predetermined force.

6. The end effector of claim 5, wherein the force compliance sub-system comprises:
   rods;
   ball joints;
   linear slides that slidably retain the rods; and
   springs coupled to the rods and ball joints,
   wherein the rods, the ball joints, the linear slides, and the springs cooperate to allow the sanding head to angularly and linearly comply with surfaces of the workpiece.

7. The end effector of claim 1, further comprising a fluid delivery sub-system configured to dispense cleaning fluid onto one or both of the sander or the workpiece.

8. The end effector of claim 7, wherein the fluid delivery sub-system comprises:
   a first fluid container retaining a cleaning agent;
   a second fluid container retaining a mixing fluid;
   a mixing chamber fluidly coupled to the first fluid container and the second fluid container, wherein the cleaning agent and the mixing fluid are combined in the mixing chamber to form a cleaning fluid;
   a fluid outlet fluidly coupled to the mixing chamber, wherein the cleaning fluid is dispensed out of the fluid outlet; and
   one or more pumps operatively coupled to one or more of the first fluid container, the second fluid container, or the mixing chamber, wherein the one or more pumps are configured to pump the cleaning agent and the mixing fluid to the mixing chamber, and the cleaning fluid out of the fluid outlet onto one or both of the sander or the workpiece.

9. The end effector of claim 1, wherein the coupler allows the end effector to be removed from the arm without portions of the end effector remaining on the arm.

10. A robotic sanding system comprising:
    one or more arms;
    one or more actuators operatively coupled to the one or more arms; and
    an end effector coupled to the one or more arms, wherein the end effector comprises:
       a sanding head including a sander configured to sand a surface of a workpiece;
       a motor operatively coupled to the sander, wherein the motor is configured to rotate the sander to sand the surface of the workpiece, wherein the motor comprises a first central longitudinal axis;

a coupler configured to removably secure the end effector to an attachment interface of an arm of the robotic sanding system, wherein the coupler comprises one or more of clamps, latches, plugs, sockets, or electrical interfaces that removably couple to reciprocal features of the attachment interface, wherein the coupler comprises a second central longitudinal axis, and wherein the first central longitudinal axis is offset from the second central longitudinal axis; and one or more sensors coupled to the sanding head, wherein the one or more sensors are configured to detect presence of a metal within a predefined range, and wherein the motor is prevented from activation in response to the metal being outside of the predefined range.

11. The robotic sanding system of claim 10, wherein the sanding head further comprises one or more brushes configured to capture one or more of debris or cleaning fluid.

12. The robotic sanding system of claim 10, wherein the end effector further comprises a force compliance sub-system configured to ensure that the sanding head engages the workpiece with a predetermined force.

13. The robotic sanding system of claim 12, wherein the force compliance sub-system comprises:

rods;

ball joints;

linear slides that slidably retain the rods; and springs coupled to the rods and ball joints, wherein the rods, the ball joints, the linear slides, and the springs cooperate to allow the sanding head to angularly and linearly comply with surfaces of the workpiece.

14. The robotic sanding system of claim 13, wherein the end effector further comprises a fluid delivery sub-system configured to dispense cleaning fluid onto one or both of the sander or the workpiece.

15. The robotic sanding system of claim 14, wherein the fluid delivery sub-system comprises:

a first fluid container retaining a cleaning agent;

a second fluid container retaining a mixing fluid;

a mixing chamber fluidly coupled to the first fluid container and the second fluid container, wherein the cleaning agent and the mixing fluid are combined in the mixing chamber to form a cleaning fluid;

a fluid outlet fluidly coupled to the mixing chamber, wherein the cleaning fluid is dispensed out of the fluid outlet; and one or more pumps operatively coupled to one or more of the first fluid container, the second fluid container, or the mixing chamber, wherein the one or more pumps are configured to pump the cleaning agent and the mixing fluid to the mixing chamber, and the cleaning fluid out of the fluid outlet onto one or both of the sander or the workpiece.

16. The robotic sanding system of claim 10, wherein the coupler allows the end effector to be removed from the arm without portions of the end effector remaining on the arm.

17. A robotic sanding method, comprising:

providing an end effector with a sanding head including a sander configured to sand a surface of a workpiece, wherein an electric motor is coupled to the sander within the end effector, wherein one or more sensors are coupled to the sanding head, and wherein the one or more sensors are configured to detect presence of a metal within a predefined range; and preventing activation of the electric motor in response to the metal being outside of the predefined range.

18. The robotic sanding method of claim 17, wherein the electric motor comprises a first central longitudinal axis, wherein a coupler removably secures the end effector to an attachment interface of an arm of a robotic sanding system, wherein the coupler comprises one or more of clamps, latches, plugs, sockets, or electrical interfaces that removably couple to reciprocal features of the attachment interface, and wherein the coupler further comprises a second central longitudinal axis that is offset from the first central longitudinal axis.

19. The robotic sanding method of claim 17, further comprising ensuring, by a force compliance sub-system, that the sanding head engages the workpiece with a predetermined force.

20. The robotic sanding method of claim 17, further comprising dispensing, by a fluid delivery sub-system, cleaning fluid onto one or both of the sander or the workpiece.

21. The robotic sanding method of claim 20, wherein said dispensing comprises:

retaining a cleaning agent within a first fluid container;

retaining water within a second fluid container;

fluidly coupling a mixing chamber to the first fluid container and the second fluid container;

combining the cleaning agent and the water in the mixing chamber to form the cleaning fluid;

coupling a fluid outlet to the mixing chamber; and dispensing the cleaning fluid out of the fluid outlet.

22. The robotic sanding method of claim 21, wherein said dispensing further comprises:

operatively coupling one or more pumps to one or more of the first fluid container, the second fluid container, or the mixing chamber; and pumping, by the one or more pumps, the cleaning agent and the water to the mixing chamber, and the cleaning fluid out of the fluid outlet onto one or both of the sander or the workpiece.

* * * * *